(12) United States Patent
Horikoshi

(10) Patent No.: US 10,082,991 B2
(45) Date of Patent: Sep. 25, 2018

(54) INFORMATION PROCESSING APPARATUS, CONTROL METHOD OF INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Takashi Horikoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 15/152,662

(22) Filed: May 12, 2016

(65) Prior Publication Data

US 2016/0350035 A1    Dec. 1, 2016

(30) Foreign Application Priority Data

May 29, 2015   (JP) .................................. 2015-110805

(51) Int. Cl.
| | |
|---|---|
| *G06F 3/12* | (2006.01) |
| *G06F 9/4401* | (2018.01) |
| *G06F 8/61* | (2018.01) |
| *H04L 29/06* | (2006.01) |

(52) U.S. Cl.
CPC .......... *G06F 3/1225* (2013.01); *G06F 3/1204* (2013.01); *G06F 3/1209* (2013.01); *G06F 3/1226* (2013.01); *G06F 3/1285* (2013.01); *G06F 8/61* (2013.01); *G06F 9/4411* (2013.01); *H04L 69/18* (2013.01)

(58) Field of Classification Search
CPC ........ G06F 3/1225; G06F 8/61; G06F 3/1209; G06F 3/1204; G06F 3/1226; G06F 9/4411; G06F 3/1285; H04L 69/18
See application file for complete search history.

(56) References Cited

U.S. PATENT DOCUMENTS

| | | | |
|---|---|---|---|
| 2007/0201384 A1* | 8/2007 | Cunningham | H04L 41/0856 370/254 |
| 2011/0080852 A1* | 4/2011 | Kishimoto | H04N 1/00204 370/255 |
| 2011/0261400 A1 | 10/2011 | Saito | 358/1.15 |
| 2012/0019864 A1 | 1/2012 | Mickeleit et al. | 358/1.15 |

FOREIGN PATENT DOCUMENTS

| | | |
|---|---|---|
| EP | 1 339 190 A2 | 8/2003 |
| JP | 4877127 B2 | 2/2012 |

OTHER PUBLICATIONS

Extended European Search Report dated Oct. 10, 2016 in counterpart EPA 16000938.7 (in English).

* cited by examiner

*Primary Examiner* — Kent Yip

(74) *Attorney, Agent, or Firm* — Fitzpatrick, Cella, Harper & Scinto

(57) ABSTRACT

A device search is executed using a first network protocol capable of searching for a device in a first subnet including an information processing apparatus and a second subnet not including the information processing apparatus (a first search). A device search is executed using a second network protocol capable of searching for a device in only the first subnet among the first subnet and the second subnet (a second search). According to whether or not a selected device selected by a user among one or a plurality of devices detected by the first search is detected by the second search, a communication port for the selected device is determined.

22 Claims, 7 Drawing Sheets

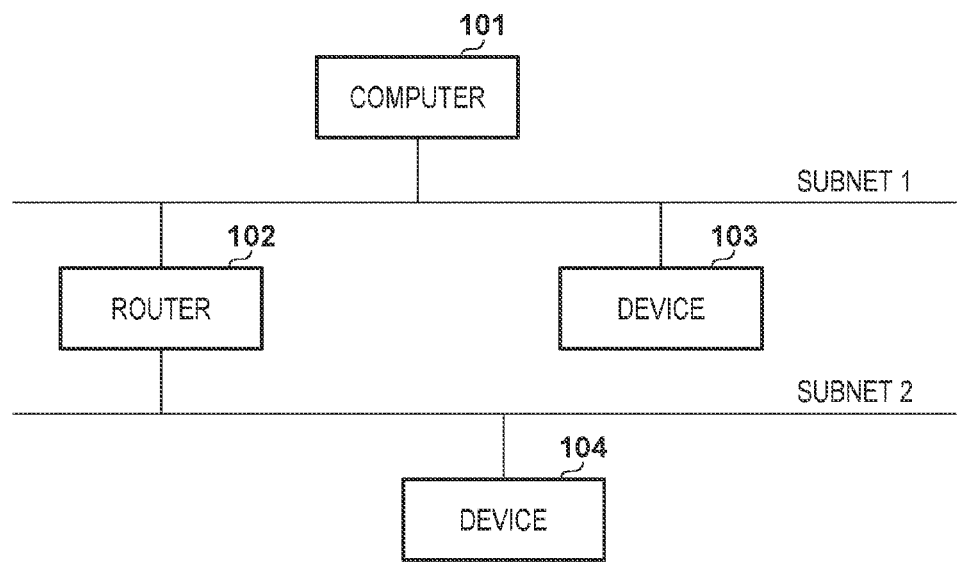
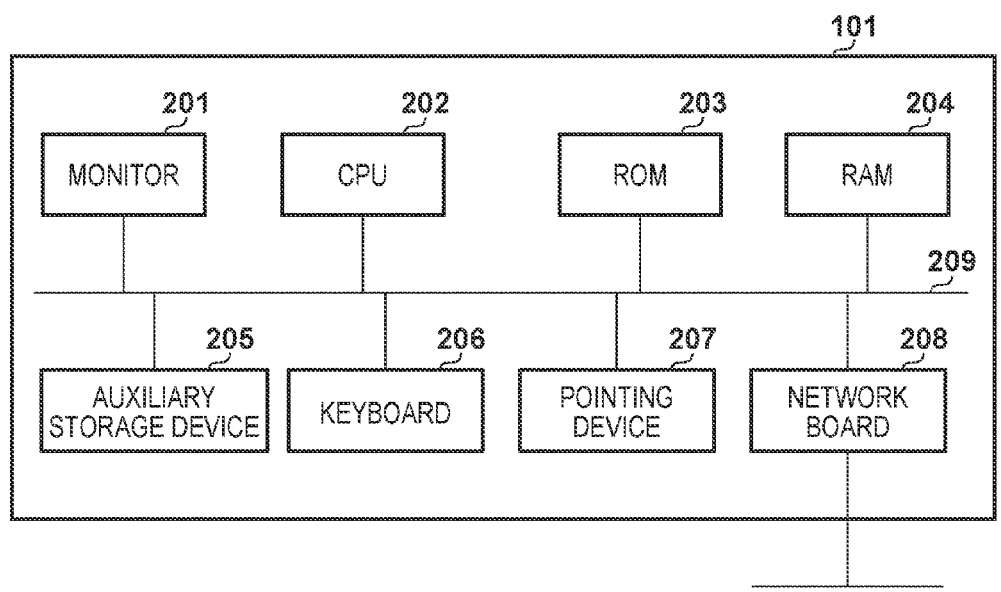

FIG. 6

LIST OF DETECTED DEVICES

601

DEVICES WERE DETECTED ON THE NETWORK. PLEASE SELECT A DEVICE TO USE AND THEN CLICK [NEXT].

| DEVICE NAME | MAC ADDRESS | IP ADDRESS |
|---|---|---|
| Cano ABC-123 | 12:34:56:78:90:AB | 192.168.0.1 |
| Cano ABC-123 | 12:34:56:78:90:CD | 192.168.0.2 |
| Cano ABC-123 | 12:34:56:78:90:EF | 192.168.0.3 |

UPDATE

< BACK    NEXT >    CANCEL

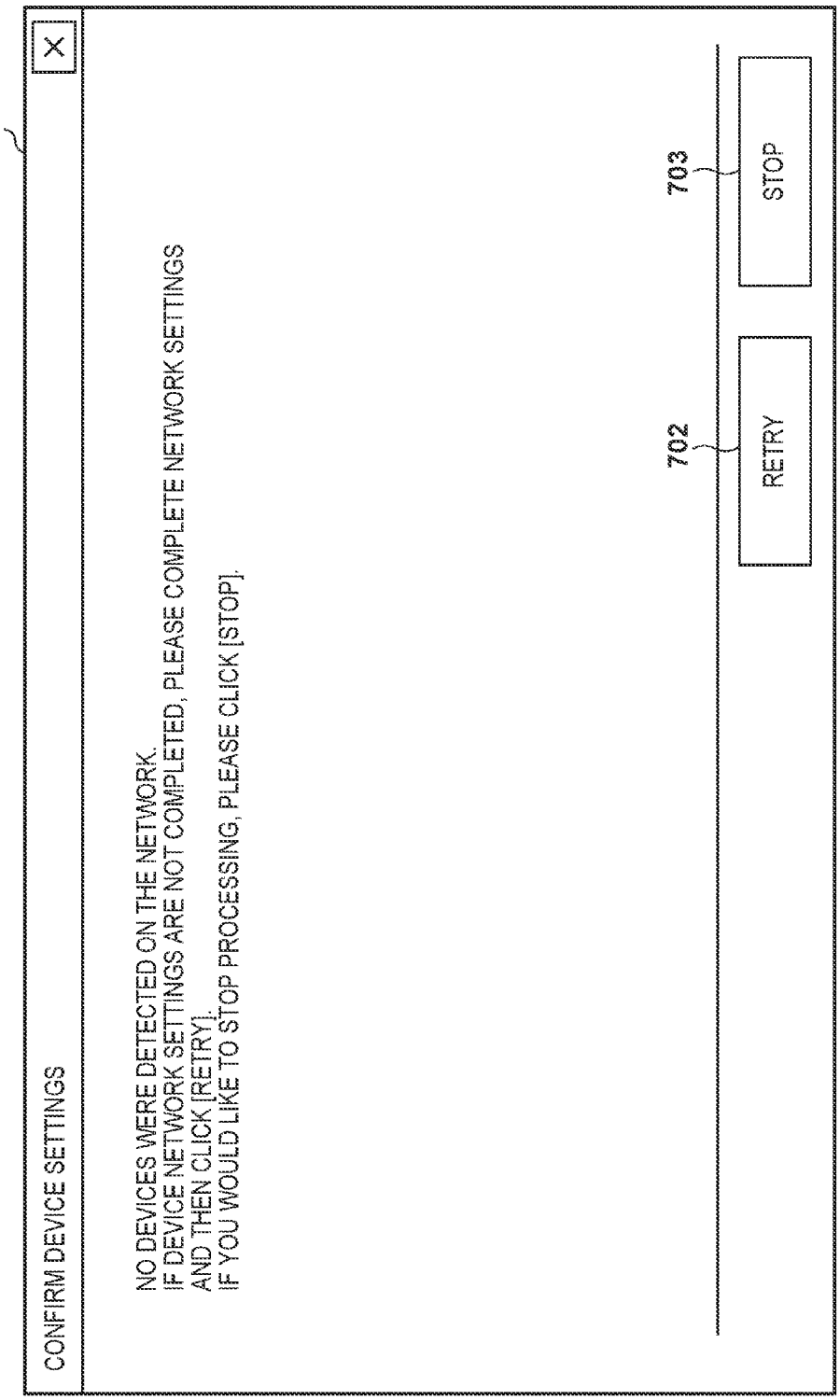

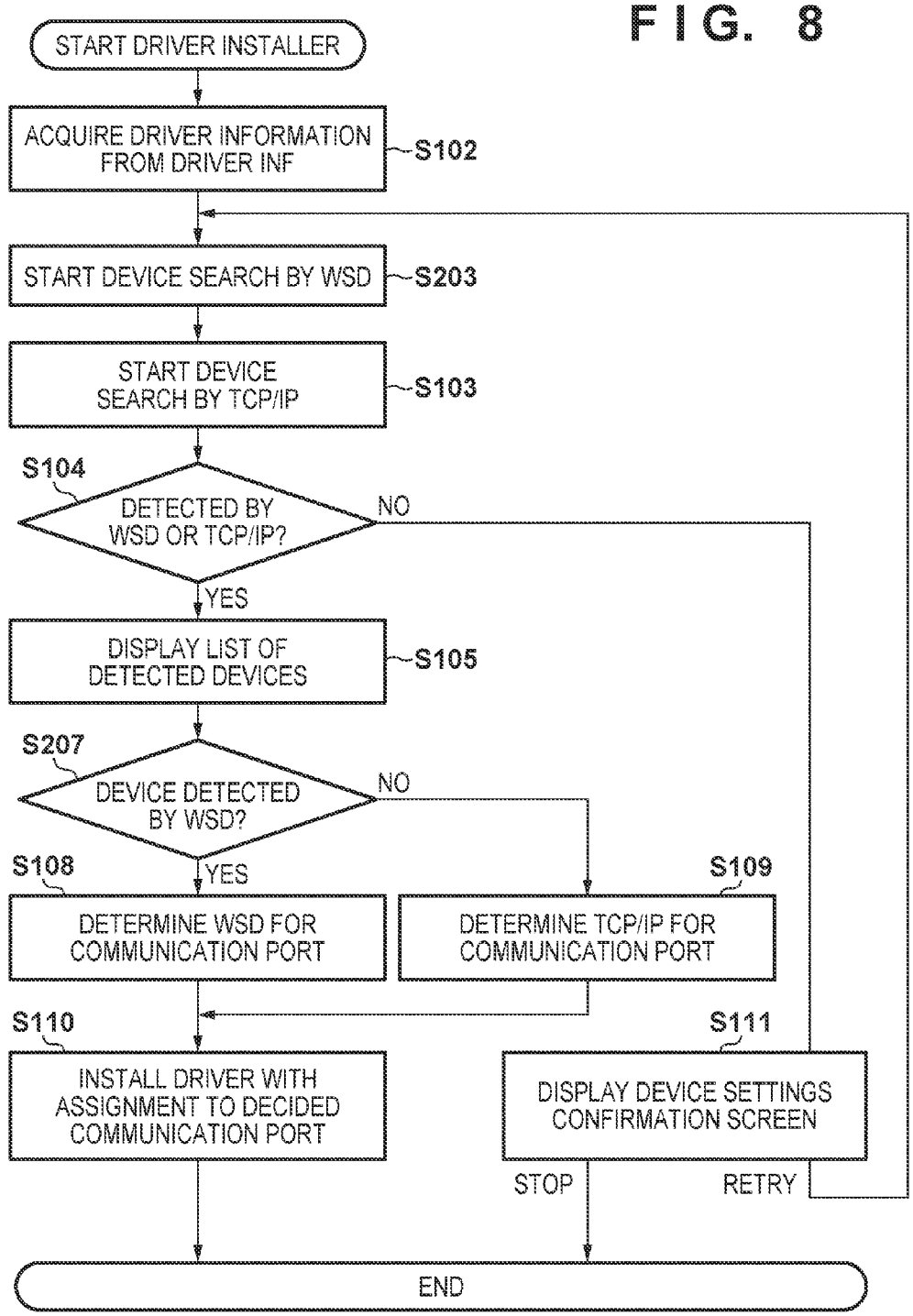

INFORMATION PROCESSING APPARATUS, CONTROL METHOD OF INFORMATION PROCESSING APPARATUS, AND NON-TRANSITORY COMPUTER-READABLE STORAGE MEDIUM

BACKGROUND OF THE INVENTION

Field of the Invention

The present invention relates to information processing technology, and more specifically relates to technology for determining a communication port of a device connected to a network.

Description of the Related Art

Among methods for searching from a computer for devices such as image forming devices connected to a network, and installing on the computer a device driver compatible with a device specified by the search, the following sort of method is widely known. That is, a method is known in which a printer driver or a scanner driver is associated with a communication port compatible with a predetermined network protocol.

In the past, a device search protocol came to be independently developed by the manufacturer who developed a device. However, recently, as a standard function of an OS, it has become possible to search for devices compatible with a UPnP protocol and install a device driver, associated with a communication port compatible with that protocol. Note that OS is an abbreviation for Operating System, and UPnP is an abbreviation for Universal Plug and Play.

Devices compatible with both a proprietary device search protocol and an OS-standard device search protocol have become more common, but there is a possibility that a device cannot be detected depending on a network state or a device state. In Japanese Patent No. 4877127, a method is disclosed in which, when a printer was detected using a first protocol but was not detected using a second protocol having a higher priority, the printer is searched for again using the second protocol, and thus a device compatible with a specified protocol is reliably detected.

In an office environment for example, there are many situations where devices are installed on different subnets, and the ability to reliably and stably use the devices installed on different subnets is desired.

However, there are cases where a device search by the OS-standard UPnP protocol is limited to a search within the same subnet, and there are cases where devices installed on different subnets cannot be detected.

Also, a device becomes usable for the first time after successfully associating a device driver with a communication port compatible with a network protocol. However, when a user installs a device driver, it is necessary for the user him/herself to determine whether or not the computer and the device exist within the same subnet, and determine a communication port according to the result of that determination. For example, when the user desires to use a communication port employing an OS-standard protocol, it is necessary for the user him/herself to check whether or not the computer and the device exist within the same subnet. Also, it is necessary for the user him/herself to determine a communication port compatible with an OS-standard protocol in a case where the computer and the device exist within the same subnet, and determine a communication port compatible with a separate protocol capable of detecting a device that exists on a different subnet than the computer in a case where the computer and the device do not exist within the same subnet.

SUMMARY OF THE INVENTION

The present invention has been made in consideration of such problems, and provides technology for enabling a user to reliably and stably use a device regardless of whether or not an information processing apparatus and the device exist within the same subnet.

According to the first aspect of the present invention, there is provided an information processing apparatus, comprising: a first search unit configured to execute a device search using a first network protocol capable of searching for a device in a first subnet including the information processing apparatus and a second subnet not including the information processing apparatus; a second search unit configured to execute a device search using a second network protocol capable of searching for a device in only the first subnet among the first subnet and the second subnet; and a determination unit configured to determine, according to whether or not a selected device selected by a user among one or a plurality of devices detected by the first search unit is detected by the second search unit, a communication port for the selected device.

According to the second aspect of the present invention, there is provided a control method of an information processing apparatus, comprising: executing a device search using a first network protocol capable of searching for a device in a first subnet including the information processing apparatus and a second subnet not including the information processing apparatus; and determining, according to whether or not a selected device selected by a user among one or a plurality of devices detected by the device search is detected using a second network protocol capable of searching for a device in only the first subnet among the first subnet and the second subnet, a communication port for the selected device.

According to the third aspect of the present invention, there is provided a non-transitory computer-readable storage medium storing a computer program for causing a computer to function as: a first search unit configured to execute a device search using a first network protocol capable of searching for a device in a first subnet including the computer and a second subnet not including the computer; a second search unit configured to execute a device search using a second network protocol capable of searching for a device in only the first subnet among the first subnet and the second subnet; and a determination unit configured to determine, according to whether or not a selected device selected by a user among one or a plurality of devices detected by the first search unit is detected by the second search unit, a communication port for the selected device.

Further features of the present invention will become apparent from the following description of exemplary embodiments (with reference to the attached drawings).

BRIEF DESCRIPTION OF THE DRAWINGS

FIG. 1 is a block diagram showing an exemplary configuration of a system.

FIG. 2 is a block diagram showing an exemplary hardware configuration of a computer 101.

FIG. 6 shows an exemplary display of information relating to devices by a device detection unit 408.

FIG. 7 shows an exemplary display by an application 401.

FIG. 8 is a flowchart of processing performed by the computer 101.

DESCRIPTION OF THE EMBODIMENTS

Figure 3:
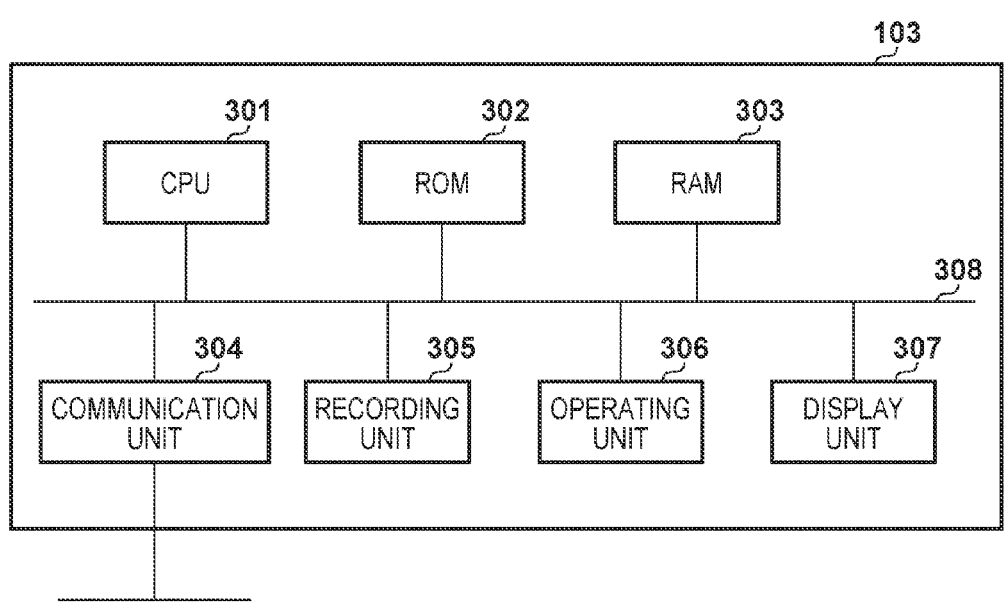
FIG. 3 is a block diagram showing an exemplary hardware configuration of devices 103 and 104.

Below, embodiments of the present invention will be described with reference to the attached drawings. It should be noted that each embodiment described below is given as an example of a specific embodiment of the present invention, and therefore is one specific example of a configuration described in the claims.

In each embodiment below, an example of the following sort of information processing apparatus is described. That is, a device search is executed using a first network protocol capable of searching for a device in a first subnet including an information processing apparatus and a second subnet not including the information processing apparatus (a first search). Also, a device search is executed using a second network protocol capable of searching for a device in only the first subnet among the first subnet and the second subnet (a second search). Then, according to whether or not a selected device selected by a user among one or a plurality of devices detected by the first search is detected by the second search, a communication port for the selected device is determined.

First, an exemplary configuration of a system according to each embodiment below will be described with reference to the block diagram in FIG. 1. As shown in FIG. 1, the system according to the present embodiment includes a subnet 1 to which a computer 101 and a device 103 belong, and a subnet 2 to which a device 104 belongs, and the subnet 1 and the subnet 2 are connected through a router 102.

The computer 101 is a computer device such as a PC (Personal Computer) or a tablet terminal device. The devices 103 and 104 are peripheral devices such as a printer, a copying device, a facsimile device, or a scanner, or a device provided with a combination of the functions of such devices. In the present embodiment, the devices 103 and 104 are compatible with a TCP/IP protocol, and are also compatible with a WSD (Web Services for Devices) protocol, which is a Windows OS-standard network protocol compatible with UPnP.

Note that the configuration of the system shown in FIG. 1 is only an example provided to facilitate the below description, and is not intended to be a limitation of the present invention. For example, the number of devices belonging to the subnet 1, and the number of devices belonging to the subnet 2, are not limited to one device as shown in FIG. 1, and may also be a plurality of devices. Also, the number of subnets is not limited to two subnets as shown in FIG. 1, and may be three or more subnets.

Next, an exemplary hardware configuration of the computer 101 will be described with reference to the block diagram in FIG. 2. Note that the configuration shown in FIG. 2 is only one example of a configuration applicable in the computer 101.

A monitor 201 is configured from a CRT, a liquid crystal screen, or the like, and is a display device capable of displaying results of processing by a CPU 202 using images, characters, or the like. The monitor 201 may also be a projection device (for example, a projector device) that projects images or characters, or may be a touch panel screen having a display function and a user interface function.

The CPU 202, by executing processing using a computer program or data stored in a ROM 203 or a RAM 204, controls operation of the entire computer 101, and executes or controls each process described later as processing performed by the computer 101.

Basic software such as a BIOS, settings data that does not need to change, and the like are stored in the ROM 203.

The RAM 204 has an area for storing a computer program or data that has been loaded from an auxiliary storage device 205 or the ROM 203, and various computer programs and data received from outside through a network board 208. Further, the RAM 204 has a work area used when the CPU 202 executes various processing. Thus, various areas can be provided as appropriate in the RAM 204.

The auxiliary storage device 205 is a high capacity information storage device represented by a hard disk drive device. An OS, various driver software, various application software, and the like are saved in the auxiliary storage device 205.

The driver software saved in the auxiliary storage device 205 includes, for example, display control driver software for controlling display by the monitor 201. Also, the driver software saved in the auxiliary storage device 205 includes keyboard driver software for controlling a keyboard 206, and pointing device driver software for controlling a pointing device 207. Also, the driver software saved in the auxiliary storage device 205 includes a network driver for controlling communication by the network board 208. Also, the driver software saved in the auxiliary storage device 205 includes driver software for controlling various devices (devices connected to the respective subnets) including the devices 103 and 104. The driver software for controlling the devices 103 and 104 is, for example, a scanner driver, a printer driver, a facsimile device driver, or the like.

Also, a driver installer for installing driver software in the computer 101 is saved in the auxiliary storage device 205. This driver installer includes a function to search for devices using the TCP/IP protocol, and a function to search for devices using the WSD protocol. Note that a configuration may also be adopted in which the function to search for devices using the TCP/IP protocol and the function to search for devices using the WSD protocol are respectively provided in dedicated modules, and execution of a device search is caused by a call-out from a device driver or an application.

Other than the above, computer programs and data for causing the CPU 202 to execute each process described later as processing performed by the computer 101 are saved in the auxiliary storage device 205. The computer programs and data saved in the auxiliary storage device 205 are loaded into the RAM 204 as appropriate according to control by the CPU 202, and are subject to processing by the CPU 202.

The keyboard 206 and the pointing device 207 are both user interfaces for inputting various instructions to the CPU 202 by an operator of the computer 101 operating these devices.

The network board 208 performs data communication with an external device. The monitor 201, the CPU 202, the ROM 203, the RAM 204, the auxiliary storage device 205, the keyboard 206, the pointing device 207, and the network board 208 described above are each connected to a bus 209.

Next, an exemplary hardware configuration of the devices 103 and 104 will be described with reference to the block diagram in FIG. 3. Note that below, in order to simplify the description, the devices 103 and 104 are described as devices having the same configuration. Therefore, in FIG. 3, an exemplary hardware configuration of the device 103 is shown, but a similar description is also applicable to the device 104. Also note that the configuration shown in FIG. 3 is only one example of a configuration applicable to the device 103. Of course, the devices 103 and 104 may also be devices having a different configuration from each other (for example, where one device is a printer, and the other device is a scanner).

A CPU 301, by executing processing using a computer program or data stored in a ROM 302 or a RAM 303, controls operation of the entire device 103, and executes or controls each process described as processing performed by the device 103.

Computer programs and data for causing the CPU 301 to execute or control each process described as processing performed by the device 103 are stored in the ROM 302. The RAM 303 has an area for storing computer programs or data that have been loaded from the ROM 302, and computer programs or data received from outside by a communication unit 304. Further, the RAM 303 has a work area used when the CPU 301 executes various processing. Thus, various areas are provided as appropriate in the RAM 303.

The communication unit 304 performs data communication with an external device. A recording unit 305 records images, characters, or the like to a recording medium such as paper based on print data. An operating unit 306 is an input device such as a touch panel or a hard key. A display unit 307 is a liquid crystal screen, and is capable of displaying results of processing by the CPU 301 using images, characters, or the like.

The CPU 301, the ROM 302, the RAM 303, the communication unit 304, the recording unit 305, the operating unit 306, and the display unit 307 described above are each connected to a bus 308. Note that the configuration shown in FIG. 3 is an exemplary configuration in which the device 103 is a printer, and in a case where the device 103 is a scanner for example, the device 103 further has a configuration that reads, as an image, information that has been recorded to a recording medium such as paper.

First Embodiment

Figure 4:
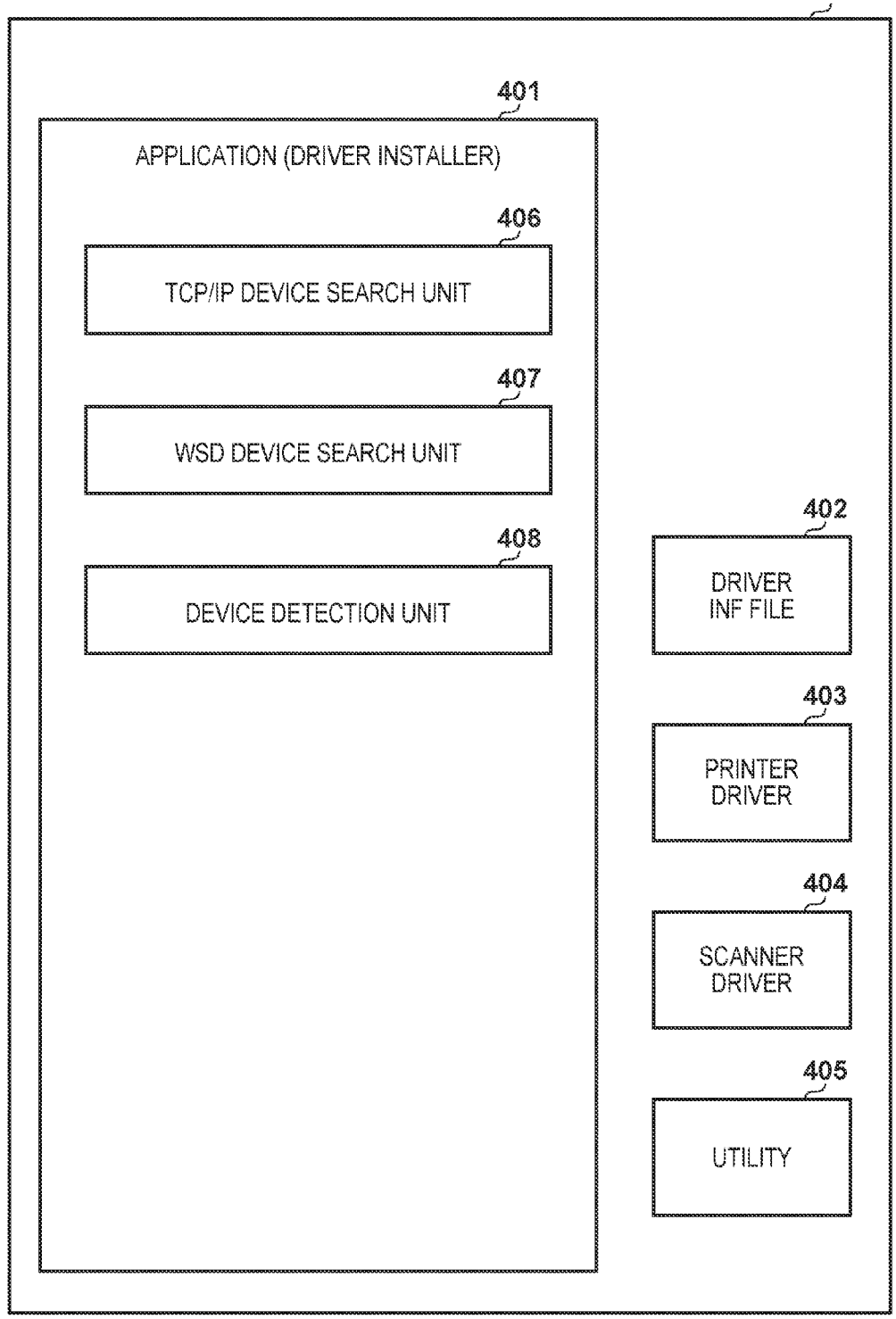
FIG. 4 is a block diagram showing an exemplary software configuration saved in an auxiliary storage device 205.

An exemplary software configuration saved in the auxiliary storage device 205 is shown in FIG. 4. Below, there are instances where software (a function unit) shown in FIG. 4 is described as the core of processing, but in reality, a corresponding function is realized by the CPU 202 executing corresponding software.

An application 401 is an installer that operates in the following manner. That is, the application 401 searches for devices on a network, displays information relating to a device detected by that search in the monitor 201, and installs in the computer 101 a driver of a device corresponding to information selected by a user among the information that was displayed. Note that if the device selected by the user is a printer, the application 401 installs a printer driver 403 in the computer 101. Also, if the device selected by the user is a scanner, the application 401 installs a scanner driver 404 in the computer 101. Also, a utility 405 is installed as appropriate according to the selected device.

When the application 401 is started, a TCP/IP device search unit 406 searches for devices from the same subnet as the subnet to which the computer 101 belongs (the subnet 1 in FIG. 1). Further, the TCP/IP device search unit 406 searches for devices from a forward subnet (the subnet 2 in FIG. 1) that is over the router 102. In the case shown in FIG. 1, when the application 401 is started, by performing these searches, the device 103 on the subnet 1 and the device 104 on the subnet 2 are detected.

A driver INF file 402 includes a type of a device compatible with a driver (the printer driver 403 and/or the scanner driver 404) installed by the application 401.

A device detection unit 408 compares device name information of target devices (a type of device compatible with the application 401) acquired from the driver INF file 402 including driver information to device name information of devices found by the TCP/IP device search unit 406. Then, the device detection unit 408 displays in the monitor 201 information relating to devices regarding which the device name information matched. In the case shown in FIG. 1, information relating to the device 103 and information relating to the device 104 is displayed in the monitor 201 in a case where the device 103 and the device 104 are devices that should be detected by the TCP/IP device search unit 406 (the type of device compatible with the application 401). The information to be displayed is information that can be used to discern the device desired by the user, such as a device name, an IP address, a MAC address, or the like.

That is, for example, even if there are a plurality of types of devices included on the network, only the type of device corresponding to a driver to be installed by the application 401 is displayed in the monitor 201. Also, in a case where a plurality of devices of that type were detected, the user can select a desired device from among the plurality of devices of the same type by referring to the IP address or the MAC address. The above display will be described in detail with reference to FIG. 6.

When the user uses the keyboard 206 or the pointing device 207 to instruct (select) any one information item among the information relating to a device displayed in the monitor 201, a WSD device search unit 407 searches for devices corresponding to the instructed (selected) information. At this time, the range of the device search using the WSD protocol is limited to the same subnet as the computer 101 where the application 401 was started. Therefore, the WSD device search unit 407 is able to search for devices from the same subnet as the subnet (the subnet 1 in FIG. 1) to which the computer 101 belongs. However, due to restriction of the range of the device search using the WSD protocol, the WSD device search unit 407 is not able to search for devices from a forward subnet (the subnet 2 in FIG. 1) that is over the router 102. However, in the case shown in FIG. 1, the results of searching by the WSD device search unit 407 are 'device 103' if the device 103 is connected to the subnet 1, and 'no device' if the device 103 is not connected to the subnet 1.

In a case where the WSD device search unit 407 detected a device (a device selected by the user) from the same subnet as the subnet to which the computer 101 belongs, the application 401 determines that communication using the WSD protocol is possible. Then, the application 401 installs driver software for that device in the computer 101, assigned to a WSD communication port.

On the other hand, in a case where the WSD device search unit 407 could not detect a device (a device selected by the user) from the same subnet as the subnet to which the computer 101 belongs, the application 401 determines that communication using the WSD protocol is not possible. Then, the application 401 installs driver software for that device in the computer 101, assigned to a TCP/IP communication port.

An exemplary display of information relating to devices by the device detection unit 408 is shown in FIG. 6. A window 601 is displayed in the monitor 201 by the device detection unit 408. Within the window 601, a device name, a MAC address, and an IP address are displayed as information relating to a device for which the device name information matched in the comparison by the device detection unit 408. In the example shown in FIG. 6, a device name, a MAC address, and an IP address of a device having a device name 'Cano ABC-123' are displayed in the first line. Also, a device name, a MAC address, and an IP address of another device of the same type 'Cano ABC-123' are displayed in the second and third lines. In the three lines, devices of the same type are displayed, so the device names are the same, but the MAC addresses and the IP addresses are individually assigned to the devices, so those values differ between devices. Therefore, the user can check whether the device type 'Cano ABC-123' corresponding to the application 401 was appropriately detected, and can check the MAC address and the IP address of each device. In this way, information of each device is displayed in respective lines. The user can check the MAC address and the IP address, and use the keyboard 206 and the pointing device 207 to instruct (select) the line corresponding to a desired device. When the user instructs a 'next' button after instructing any line, the WSD device search unit 407 searches for the device corresponding to the instructed line.

On the other hand, when the TCP/IP device search unit 406 could not find a device, the application 401 displays in the monitor 201 a window 701 shown as an example in FIG. 7. This window 701 includes a message indicating that a device could not be detected from any subnet. When the user instructs a 'retry' button 702 in the window 701, the TCP/IP device search unit 406 again starts a search. On the other hand, when the user instructs a 'stop' button 703, processing is stopped.

Processing performed by the CPU 202 of the computer 101 executing the application 401 loaded from the auxiliary storage device 205 to the RAM 204 will be described with reference to the flowchart in FIG. 5. In Step S102, the device detection unit 408 acquires driver name information of devices corresponding to the application 401 from the driver INF file 402 including driver information.

In Step S103, the TCP/IP device search unit 406 searches for devices from the same subnet as the subnet to which the computer 101 belongs. Further, the TCP/IP device search unit 406 searches for devices from a forward subnet that is over the router 102.

In Step S104, the device detection unit 408 compares the device name information acquired in Step S102 to device name information of devices found by the TCP/IP device search unit 406. In the results of this comparison, if there is matching device name information, processing advances to Step S105, and if there is no matching device name information, processing advances to Step S111. A case where there is matching device name information means a case where a device of a type compatible with a driver that the application 401 can install exists on the network.

In Step S105, the device detection unit 408 displays in the monitor 201 information relating to a device regarding which the device name information matched. By the processing in Steps S104 and S105, display in the monitor 201 is limited to, among a plurality of devices that exist on the network, a device compatible with the application 401.

In Step S106, the WSD device search unit 407 searches, from 'the same subnet as the computer 101', for devices corresponding to information instructed (selected) by the user among information relating to devices of the same type that is displayed in the monitor 201. When the result of this search is that a device was found, processing proceeds through Step S107 to Step S108, and when the result is that a device was not found, processing proceeds through Step S107 to Step S109.

In Step S108, the application 401 determines that communication using the WSD protocol is possible, and determines to use a WSD communication port, which is a communication port usable in the WSD protocol, as the communication port.

On the other hand, in Step S109, the application 401 determines that communication using the WSD protocol is not possible, and determines to use a TCP/IP communication port, which is a communication port usable in the TCP/IP protocol, as the communication port.

In Step S110, the application 401 installs driver software for the device selected by the user in the computer 101, assigned to the communication port determined in Step S108 or Step S109.

In the case shown in FIG. 1, in a case where the user selected the device 103, the device 103 is connected on the subnet 1, which is 'the same subnet as the computer 101', so the device 103 is detectable by the WSD device search unit 407. In such a case, a WSD communication port is determined as the communication port. On the other hand, in a case where the user selected the device 104, the device 104 is connected not on the subnet 1, which is 'the same subnet as the computer 101', but on the subnet 2, so the device 104 is not detectable by the WSD device search unit 407. In this sort of case, a TCP/IP communication port is determined as the communication port.

In Step S111, the application 401 displays in the monitor 201 the window 701 shown as an example in FIG. 7. In this window 701, when the 'stop' button 703 is instructed, processing according to the flowchart in FIG. 5 ends, and when the 'retry' button 702 is instructed, processing returns to Step S103.

Figure 5:
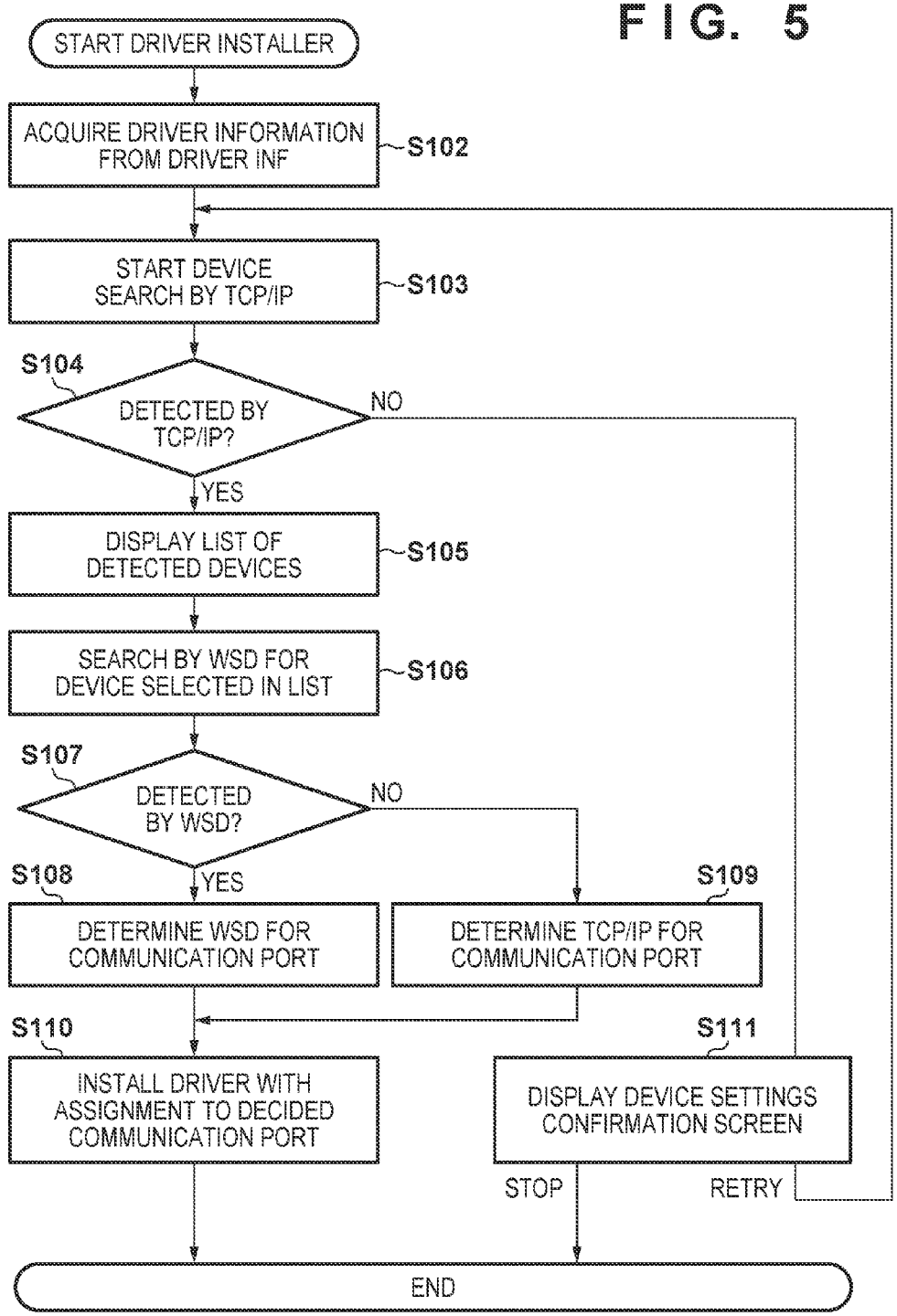
FIG. 5 is a flowchart of processing performed by the computer 101.

According to the processing shown in FIG. 5, in Step S103, devices of the same type that were found using the TCP/IP protocol, in which it is possible to perform a device search from both the subnet 1 and the subnet 2, are displayed in a list. Therefore, the user can search for devices from not only the subnet 1 including the computer 101, but also from the subnet 2. Also, a device selected from the list display by the user is found using the WSD protocol in Step S106. Further, when a device was found using the WSD protocol, a WSD communication port is automatically set, and when a device was not found using the WSD protocol, a TCP/IP communication port is automatically set. Therefore, even if the user does not consciously determine a communication port, it is possible to easily cause determining of a communication port compatible with the subnet where a selected device exists.

Note that, for example, the user may be informed of the communication port that was determined in Step S108 or S109 through the monitor 201. In this case, the user may be notified after driver installation in Step S110, or a configuration may be adopted in which the user is notified prior to driver installation, and installation is started in response to the user performing a consent instruction.

Also, in the above description, an example was described where the driver INF file 402 includes information of one type of device ('Cano ABC-123') as the type of device compatible with the driver to be installed by the application 401. However, this is not a limitation, and if the driver to be installed by the application 401 is usable for a plurality of types, the driver INF file 402 includes information of that plurality of types. In this case, when a plurality of devices corresponding to the plurality of types were detected on the network, information corresponding to the plurality of types is displayed in the list display screen shown in FIG. 6.

Second Embodiment

In the description below, differences from the first embodiment will be emphasized, and points that are not mentioned below are the same as in the first embodiment. In the present embodiment, unlike in the first embodiment, the computer 101 performs processing according to the flowchart in FIG. 8 instead of processing according to the flowchart in FIG. 5. In FIG. 8, the same step numbers are assigned to the same processing steps as the processing steps shown in FIG. 5, and a description of these processing steps is omitted here.

In Step S203, the WSD device search unit 407 searches for devices from 'the same subnet as the computer 101'.

Here, the search range of the TCP/IP device search unit 406 includes the search range of the WSD device search unit 407, so there are cases where the search results of the WSD device search unit 407 are included in the results of a search by the TCP/IP device search unit 406. However, the device name information displayed in the monitor 201 includes not only device name information of devices found by the TCP/IP device search unit 406, but also device name information of devices found by the WSD device search unit 407. However, there are cases where due to OS settings, network settings, or the like, a device cannot be found using the TCP/IP protocol, and can only be found using the WSD protocol. Therefore, in Step S104, it is determined whether or not a device was detected by the WSD protocol or the TCP/IP protocol. Then, if a device corresponding to information that was instructed (selected) by the user among information displayed in the monitor 201 is a device that was found even with the WSD device search unit 407, processing proceeds to Step S108 through Step S207. On the other hand, if a device corresponding to information that was instructed (selected) by the user among information displayed in the monitor 201 is not a device that was found with the WSD device search unit 407, processing proceeds to Step S109 through Step S207.

Modified Examples

Instead of a device compatible with the WSD protocol, a device compatible with another standard protocol such as Bonjour, or compatible with a proprietary protocol, may be used, or a device provided with a plurality of various protocols may be used. Also, regarding the communication method used for device searching, different communication methods may be used according to the application, such as unicast, multicast, or broadcast communication. Therefore, the configurations, formats, and communication methods used in the first and second embodiments are only examples.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110805, filed May 29, 2015, which is hereby incorporated by reference herein in its entirety.

What is claimed is:

1. An information processing apparatus, comprising:
a memory which stores a program,
at least one processor which executes the program stored in the memory to perform:
first device search using a first network protocol capable of searching for a device in a first subnet including the information processing apparatus and a second subnet not including the information processing apparatus;
second device search using a second network protocol capable of searching for a device in only the first subnet among the first subnet and the second subnet; and
automatic determination of a communication port to be used for a selected device selected by a user among one or a plurality of devices detected by the first device search,
wherein, in the automatic determination, the at least one processor automatically determines a first communication port corresponding to the first network protocol as the communication port to be used for the selected device, in a case where the selected device is not detected by the second device search, and
wherein, in the automatic determination, the at least one processor automatically determines a second communication port corresponding to the second network protocol as the communication port to be used for the selected device, in a case where the selected device is detected by the second device search.

2. The information processing apparatus according to claim 1,
wherein the at least one processor performs first selection of selecting, from the one or a plurality of devices detected by the first device search, the selected device according to a user instruction,
wherein after the first selection, the at least one processor performs the second device search for the selected device which has been selected by the first selection, and
wherein the at least one processor automatically determines the communication port for the selected device according to whether or not the selected device is detected by the second device search.

3. The information processing apparatus according to claim 2, wherein the at least one processor performs first display control of displaying information relating to a device detected by the first device search in a display device, wherein the at least one processor performs the first selection of selecting the selected device according to a user instruction for display by the first display control.

4. The information processing apparatus according to claim 3,
wherein the at least one processor performs the first display control of displaying information relating to, among devices detected by the first device search, a device having device name information included in a driver INF file.

5. The information processing apparatus according to claim 2,
wherein the at least one processor does not perform the second device search before the first selection is performed, and
after the first selection, the at least one processor performs the second device search for the selected device which has been selected by the first selection.

6. The information processing apparatus according to claim 1,
wherein the at least one processor performs second selection of selecting, from one or a plurality of devices detected by the first device search and the second device search, the selected device according to a user instruction,
wherein, after the second selection, the at least one processor automatically determines the communication port for the selected device according to whether or not the selected device has been detected by the second device search.

7. The information processing apparatus according to claim 6,
wherein the at least one processor performs second display control of displaying information relating to a device detected by the first device search and the second device search in a display device,
wherein the at least one processor performs the second selection of selecting the selected device according to a user instruction for display by the second display control.

8. The information processing apparatus according to claim 7,
wherein the at least one processor performs the second display control of displaying information relating to, among devices detected by the first device search and the second device search, a device having device name information included in a driver INF file.

9. The information processing apparatus according to claim 1,
wherein the at least one processor installs a driver in the information processing apparatus by assigning the driver to the determined communication port.

10. The information processing apparatus according to claim 1,
wherein in the first device search and the second device search, the at least one processor searches for a printer.

11. A control method of an information processing apparatus having a memory storing a program and at least one processor which executes the program, comprising:
performing, by the at least one processor, a first device search using a first network protocol capable of searching for a device in a first subnet including the information processing apparatus and a second subnet not including the information processing apparatus;
performing, by the at least one processor, a second device search using a second network protocol capable of searching for a device in only the first subnet among the first subnet and the second subnet; and
automatically determining, by the at least one processor, a communication port to be used for a selected device selected by a user among one or a plurality of devices detected by the first device search,
wherein, in the automatically determining, the at least one processor automatically determines a first communication port corresponding to the first network protocol as the communication port to be used for the selected device, in a case where the selected device is not detected by the second device search, and
wherein, in the automatic determining, the at least one processor automatically determines a second communication port corresponding to the second network protocol as the communication port to be used for the selected device, in a case where the selected device is detected by the second device search.

12. The control method according to claim 11,
wherein the at least one processor performs a first selecting of selecting, from the one or a plurality of devices detected by the first device search, the selected device according to a user instruction,
wherein after the first selecting, the at least one processor performs the second device search for the selected device which has been selected by the first selecting, and
wherein the at least one processor automatically determines the communication port for the selected device according to whether or not the selected device is detected by the second device search.

13. The control method according to claim 12,
wherein the at least one processor performs a first display control of displaying information relating to a device detected by the first device search in a display device, and
wherein the at least one processor performs the first selecting of selecting the selected device according to a user instruction for display in the first display control.

14. The control method according to claim 13,
wherein the at least one processor performs the first display control of displaying information relating to, among devices detected by the first device search, a device having device name information included in a driver INF file is displayed.

15. The control method according to claim 12,
wherein the at least one processor does not perform the second device search before the first selecting is performed, and
after the first selecting, the at least one processor performs the second device search for the selected device which has been selected by the first selecting.

16. The control method according to claim 11,
wherein the at least one processor performs a second selecting of selecting, from one or a plurality of devices detected by both of the first device search and the second device search, the selected device according to a user instruction,
wherein, after the second selection, the at least one processor automatically determines the communication port for the selected device according to whether or not the selected device has been detected by the second device search.

17. The control method according to claim 16,
wherein the at least one processor performs a second display control of displaying information relating to a device detected by both of the first device search and the second device search in a display device,
wherein the at least one processor performs the second selecting of selecting the selected device according to a user instruction for display by the second display control.

18. The control method according to claim 17,
wherein the at least one processor performs the second display control of displaying information relating to, among devices detected by the first device search and the second device search, a device having device name information included in a driver INF file.

19. The control method according to claim 11,
wherein the at least one processor installs a driver in the information processing apparatus by assigning the driver to the determined communication port.

20. The control method according to claim 11,
wherein the first network protocol is a TCP/IP protocol, and the second network protocol is a WSD (Web Services for Devices) protocol.

21. The control method according to claim 11,
wherein in the first device search and the second device search, the at least one processor searches for a printer.

22. A non-transitory computer-readable storage medium storing a computer program for causing a computer in an information processing apparatus to perform:
a first device search using a first network protocol capable of searching for a device in a first subnet including the information processing apparatus and a second subnet not including the information processing apparatus;
a second device search using a second network protocol capable of searching for a device in only the first subnet among the first subnet and the second subnet; and
automatically determining a communication port to be used for a selected device selected by a user among one or a plurality of devices detected by the first device search,
wherein, in the automatically determining, the computer automatically determines a first communication port corresponding to the first network protocol as the communication port to be used for the selected device, in a case where the selected device is not detected by the second device search, and
wherein, in the automatically determining, the computer automatically determines a second communication port corresponding to the second network protocol as the communication port to be used for the selected device, in a case where the selected device is detected by the second device search.

* * * * *